United States Patent [19]

Heun

[11] 3,996,558
[45] Dec. 7, 1976

[54] ERROR DETECTION AND RECOVERY FROM MAGNETIC TAPE

[75] Inventor: Kenneth D. Heun, Loveland, Colo.

[73] Assignee: Hewlett-Packard Company, Palo Alto, Calif.

[22] Filed: June 5, 1975

[21] Appl. No.: 584,081

[52] U.S. Cl. .......................... 340/146.1 AJ; 360/53
[51] Int. Cl.² ..................... G06F 11/10; G06K 5/00
[58] Field of Search ............ 340/146.1 AJ, 146.1 F; 360/31, 38, 53

[56] References Cited

UNITED STATES PATENTS

| | | | |
|---|---|---|---|
| 2,937,368 | 5/1960 | Newby | 360/31 |
| 2,944,248 | 7/1960 | Auerbach et al. | 340/146.1 AJ |
| 2,977,047 | 3/1961 | Bloch | 340/146.1 AJ |
| 3,686,629 | 8/1972 | Yu | 340/146.1 AJ |
| 3,753,225 | 8/1973 | Liddel | 340/146.1 AJ |

OTHER PUBLICATIONS

W. Janus, Skip of Magnetic Tape Defective Area, IBM Technical Disclosure Bulletin, vol. 13, No. 6, Nov. 1970, pp. 1413-1414.

Primary Examiner—Charles E. Atkinson
Attorney, Agent, or Firm—Ronald E. Grubman

[57] ABSTRACT

Improved recovery of information from magnetic tapes is provided by storing information on the tapes in the form of a number of partitions, each containing a certain number of words. A check-sum word is included at the end of each partition. When data words are stored on the tape, each partition may be of a fixed maximum length. When program lines are stored on the tape, each partition is preferably of a length such that an integral number of program lines is included in each partition. When information is read from the tape, a comparison of a sum formed from the digits stored in a partition with the associated check-sum word forms the basis for detecting an error read within a partition. An error message may be generated to alert a user to the error, while only a small amount of information on the tape is affected.

3 Claims, 1 Drawing Figure

ERROR DETECTION AND RECOVERY FROM MAGNETIC TAPE

BACKGROUND AND SUMMARY OF THE INVENTION

This invention is concerned generally with magnetic tape and more particularly with a new method for error recovery in reading information from the tape.

Numerous methods are now known for detecting and recovering from errors which occur in the reading of information from magnetic tapes. Typical errors which occur are the inclusion of extra bits which are not actually present on the tape or the omission of bits which are present. These two types of errors are especially serious because they lead to loss of synchronization. Prior art techniques vary from the very simple to the most sophisticated; for example, it is possible to simply read a tape twice and compare bit by bit to detect errors. Error detection is sometimes accomplished by inclusion of a parity bit, while more sophisticated schemes utilize more complicated codes, e.g., polynomial coding schemes, for detecting and recovering from errors. Intermediate between the simple and the most complicated methods are those which include a check-sum word on the tape usually at the end of a user data block. This word typically contains the sum of the digits of the words in the data block, which sum may be compared against an actual summing of these digits performed after their having been read from the tape, to detect a discrepancy. A discrepancy between the check-sum and the actual sum indicates that an error has occurred in the reading of the tape. An inherent difficulty with this scheme is that if a discrepancy is discovered, an entire user block of data must be discarded. When lengthy data blocks are involved, or under circumstances where numerous errors are involved, or under circumstances where numerous errors are likely to occur, this is an inconvenient and a time-consuming procedure.

The present invention provides an error recovery system in which information stored on tape is segmented into partitions, each partition including a variable word length up to some predetermined maximum number of words. A check-sum word is included at the end of each partition. When "data" is to be stored, the partitions are of a particular fixed length. However, when user program lines are stored, the partitions contain some integral number of program lines. As each partition is read from the tape, a check-sum comparison is performed to detect errors. When an error is found in the reading of a particular partition, that partition is flagged and an error indication is given to the user. For example, program lines included in that one partition may be deleted from the user output table, and an error message substituted. The user is thereby alerted to the occurrence of an error while only a small amount of information is lost to his immediate access.

DESCRIPTION OF THE DRAWINGS

The FIGURE illustrates a tape on which information is stored in partitions to facilitate error detection and recovery.

DETAILED DESCRIPTION OF THE INVENTION

Figure 1:
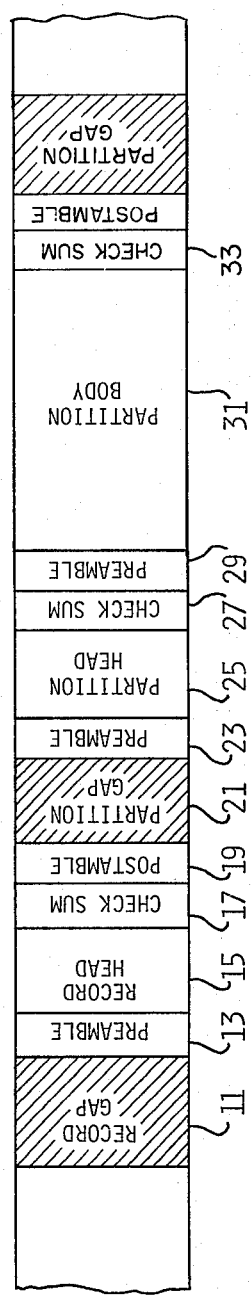

In FIG. 1 there is illustrated a segment of a magnetic tape on which is stored information in a manner to facilitate recovery in accordance with the present invention. A shaded area 11 represents a record gap indicating a break between user records. Record gap 11 is followed by a preamble section 13 which may be, e.g., a single word denoting that a record head 15 is to follow. Record head 15 may contain a number of words modifying relevant information about a record to follow. For example, the length, record number, absolute size of the record, number of words in the record and other information may be included. Following the record head there may be included a check-sum word 17 containing a word representative of the sum of the digits in the words just preceding. As is known in the art, if an actual sum performed on these digits does not correspond to the check-sum word, there has occurred an error in the reading of the preceding words. A postamble 19 which may also be a single word follows the check-sum bit to buffer the check-sum word from following portions of the tape.

At this point, a user record itself is to be stored on the tape. According to the invention, the information in the record is stored in units which will be referred to hereinafter as "partitions". To separate one partition from another, there are included on the tape partition gaps, one of which is illustrated as a shaded area labeled 21. These partition gaps may be used to resynchronize the tape, of particular importance when errors have occurred. Since the tape also includes record gaps between records (11 in FIG. 1), there must be included provisions for distinguishing the two kinds of gaps. For example, the gaps can be of different physical lengths, a long gap indicating a break between records and a shorter gap indicating a break between partitions. Numerous hardware and software schemes are known for distinguishing between long and short gaps on a tape, some of which are disclosed in U.S. Pat. application Ser. No. 510,852, filed by L. Miller and F. Wenninger on Sept. 30, 1974, and assigned to the same assignee as the present invention.

Following partition gap 21 is a preamble 23 which again may comprise a single word. Next comes a partition head 25 including a number of information words which may e.g., denote a partition number, partition length, and other identifiers. A check-sum word 27 is included to verify the previous few words of information, and this is followed by another preamble word 29. Following preamble 29 comes the body of the partition. In accordance with aspects of the invention, a partition contains some predetermined number of information words, for typical digital systems employing binary coding, 128 words has been found to be suitable. If the record being stored contains data, it is appropriate to select a fixed partition length such as 128 words. Fixed length "data" partitions facilitate preservation of correct data sequence when errors have occurred. However, if user program lines rather than data being stored, it is efficacious to choose each partition length to be such that precisely an integral number of user program lines is included in each partition. The partitioning described above may be accomplished by any of a number of techniques known in the computing and calculating arts. For example, a software program may be utilized to compute a running check-sum as information words are read into storage. The program may also store a word count so that the check-sum accumulation can be terminated when a predetermined count is reached (see, e.g., U.S. Pat. No. 2,977,047 entitled "Error Detecting and Correcting Apparatus" issued Mar. 28, 1961 to R. M. Bloch). In the case of program lines being stored rather than data, the check-sum accumulation terminates only when the word count is equal to or greater than a predetermined count, and at the same time the last word stored is the last word of a program line. Since the partitioning is an internal function (e.g., a software function) of the computer or calculator, the user is not required to make any special notation in his programs, and in fact the user will generally be completely unaware of the partitioning.

Error detection and recovery is accomplished when information is read from the tape into a computer, calculator, or the like. When a partition body 31 is read from the tape, a summation of the digits contained in the words included in that partition is compared to the check-sum 33 associated with the partition; a discrepancy indicates that a "read" error has occurred in that particular partition. In accordance with the principles of the invention, then, the error location is well-defined to within the user program lines (or data words) in the partition. Thus, whereas in prior art techniques, the check-sum error would typically cause the loss of an entire data block, in the present technique only a small number of program lines or data words are affected. This situation obtains because the system can be resynchronized with the storage medium (tape) each time an error is detected, thereby enabling a correct reading of subsequent partitions.

When an error is detected, the user may be alerted to the error in any of a number of ways; e.g., the system may respond to the check-sum discrepancy by deleting the user program lines in the suspect partition from a user print-out, and substituting an error message. Those skilled in the art will utilize any of a number of programming techniques to present this user output in response to the detected error. Of course, if another output format is desired, it is consistent with the principles of the invention to make other appropriate use of the errors detected in the partitions.

From the above discussion, it is evident that maximum recoverability from errors is accomplished by including a small number of words in a partition. However, since each partition requires a fixed amount of "overhead" in terms of tape space required for partition headings, check-sums and partition gaps thereby should be selected a partition length which is effectively a trade-off between the total capacity of information to be stored on the tape and recoverability efficiency. The above-mentioned partition length of 128 words has heretofore proved to be a suitable trade-off, although different lengths may obviously be selected consistent with the principles herein disclosed.

I claim:

1. A method of recovering from errors in the reading of data and program line blocks of information units from a storage medium, said method comprising:

segmenting the blocks of information units into partitions on the storage medium, each partition containing a predetermined number of information units, said number being determined independently of the length of any particular block of information and depending only on whether said particular information units represent data or program lines;

associating a check information unit with each partition on the storage medium;

reading the information units from a partition on the storage medium into an electronic calculating machine;

reading the check information unit associated with the partition into said electronic calculating machine;

comparing the information contained in the check information unit with error information derived from the information in the associated partition to detect errors, if any, in the reading of the information units from the partition; and marking the location of detected errors, if any.

2. A method as in claim 1 wherein the block of information represents data and the number of information units in each partition is a fixed number.

3. A method as in claim 1 wherein the block of information represents program lines and the number of information units in each partition corresponds to an integral number of program lines.

* * * * *